G. A. WELLS.
BOX FOR TRANSPORTING EGGS.

No. 103,111. Patented May 17, 1870.

Witnesses
C. F. Clausen
A. Ruppert

G. A. Wells
Inventor:
D. P. Holloway & Co.
Att'ys

United States Patent Office.

GEORGE A. WELLS, OF OSKALOOSA, IOWA.

Letters Patent No. 103,111, dated May 17, 1870.

IMPROVEMENT IN BOXES FOR TRANSPORTING EGGS.

The Schedule referred to in these Letters Patent and making part of the same

*To all whom it may concern:*

Be it known that I, GEORGE A. WELLS, of Oskaloosa, in the county of Mahaska and State of Iowa, have invented certain Improvements in Egg-Boxes; and I do hereby declare that the following is a full, clear, and exact description thereof, reference being had to the annexed drawings making part of this specification, in which—

Corresponding letters refer to corresponding parts in both figures.

Figure 1:
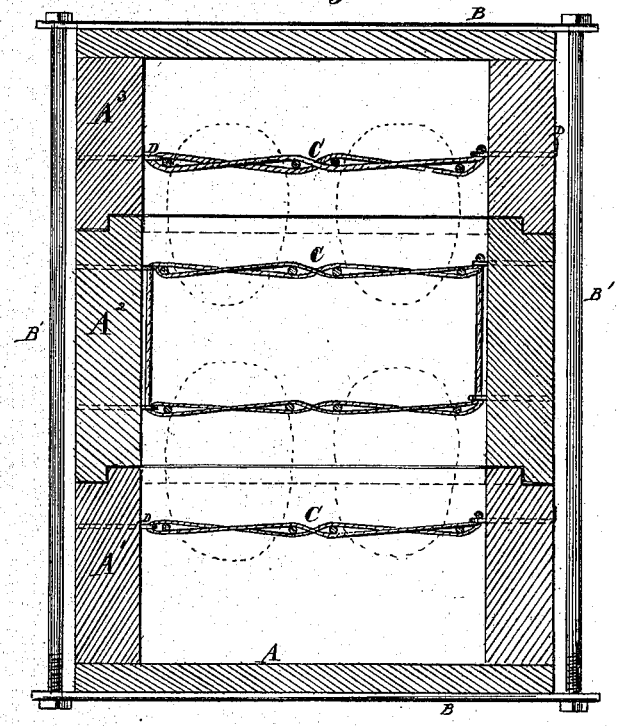
Figure 1 is a vertical sectional elevation of my improved box, showing the method of joining the sections together, the arrangement of the cords forming the net which holds the eggs, and the clamps for holding the sections in their position.

This invention relates to that class of boxes in which eggs are packed before being transported to market or from one place to another; and It consists in the construction, combination, and arrangement of its parts, as will be more fully described hereinafter.

A in the drawings refers to a box which is made up of sections $A^1$ $A^2$ $A^3$, of which there may be as many as is desired, the top and bottom ones being covers, and each being provided with end pieces, so that when all are put together they shall form a tight box.

The lower edges of the side and end pieces and the upper edges of the upper ones are smooth, so that the bottom and top boards may fit snugly thereon, whilst the opposite edges of the side pieces and both edges of the intervening ones are provided with a rabbet in their surfaces, so that, when placed one upon the other, as shown in fig. 1, they shall be prevented from slipping out of place.

Figure 2:
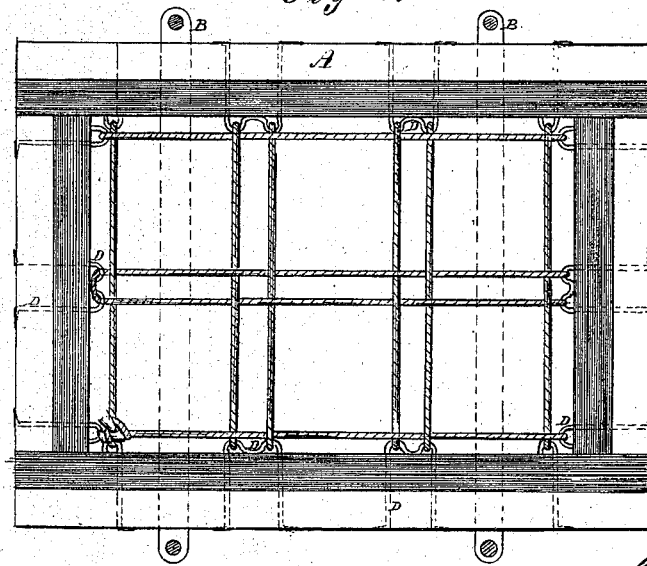
Figure 2 is a transverse section, showing the cords which form the net and the staples for holding them in position.

B B refer to bars of metal or of wood, which extend across the box upon its top and bottom surfaces and project beyond the sides thereof for a distance sufficient to permit of their being perforated to receive bolts, as shown in fig. 2.

B' B' refer to bolts which pass through the ends of bars B B, they being provided with nuts upon their outer ends, so that the sections of the box may be by them held firmly in contact with each other.

C C refer to cords or strings, which are attached to staples driven into the inner surface of the box, but which may extend through the same, and may be clenched upon the outer side. These strings or cords are so arranged that the largest spaces between them will form a receptacle for an egg, such arrangement being clearly shown in the drawings.

D D refer to the staples above alluded to, there being a sufficient number to receive the cord or string and permit it to cross and recross the box as many times as is necessary to divide it into spaces of requisite size for the reception of an egg.

In packing eggs in this box for transportation the following plan is to be pursued:

The nuts are to be screwed off from the bolts, which are then to be taken out of the straps, and each of the sections of the box is to be removed from the bottom one. When this has been done, the spaces formed in the net are to have an egg inserted therein, which, in all cases, should be done with the small end downward; and then another section is to be placed upon the first one, and its spaces filled with eggs, as above described, and so on until all the sections have been filled and placed upon each other, when the clamps are to be applied and the nuts screwed upon the bolts.

Some of the advantages due to this form of box are as follows:

First, by the use of staples for holding the cords, the liability of such cords being worn off, as they frequently are when they pass through the sides of the box, is entirely avoided;

Secondly, an elastic support is formed upon which the egg is made to rest in the best position to be transported; and Thirdly, when the cord is to be removed and replaced, it is much more conveniently done with the staples than without.

Having thus described my invention,

What I claim, and desire to secure by Letters Patent, is—

A box in which eggs are to be packed for transportation, combining in its construction a series of rabbeted sections, as $A^1$ $A^2$ $A^3$, each provided with staples and cords for supporting the eggs, and the clamps for holding the sections together, substantially as and for the purpose set forth.

In testimony whereof I have signed my name to this specification in the presence of two subscribing witnesses.

GEO. A. WELLS.

Witnesses:
WM. H. HALL,
JOSEPH ANDREWS.